F. EIDT.
COOKING UTENSIL.
APPLICATION FILED MAR. 20, 1920.
1,356,432.
Patented Oct. 19, 1920.
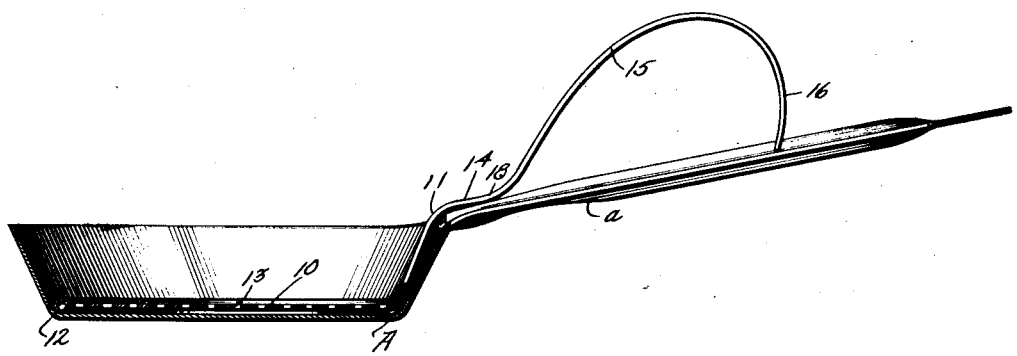
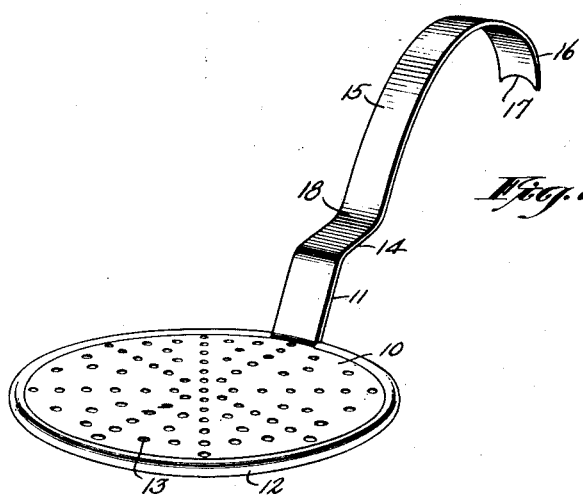
WITNESSES
INVENTOR
FRED EIDT,
BY
ATTORNEYS

UNITED STATES PATENT OFFICE.

FRED EIDT, OF WEST NEW BRIGHTON, NEW YORK.

COOKING UTENSIL.

1,356,432.     Specification of Letters Patent.     Patented Oct. 19, 1920.

Application filed March 20, 1920. Serial No. 367,519.

*To all whom it may concern:*

Be it known that I, FRED EIDT, a citizen of Germany, and a resident of West New Brighton, in the county of Richmond and State of New York, have invented a new and Improved Cooking Utensil, of which the following is a description.

My invention relates to a utensil for use with a frying pan and more particularly to a utensil adapted to be employed with a frying pan when cooking eggs, for example, and whereby the cooked article may be lifted from the frying pan and the grease permitted to drain in the lifting.

The general object of my invention is to provide a utensil of the indicated character improved in various particulars to the end that convenience and efficiency in its use may be promoted.

Reference is to be had to the accompanying drawings forming a part of this specification, it being understood that the drawings are merely illustrative of one example of the invention.

Figure 1 is a longitudinal section of a utensil embodying my invention and an ordinary frying pan showing the manner of using the utensil;

Fig. 2 is a perspective view of the utensil.

In carrying out my invention in accordance with the illustrated example, the utensil is made with a disk 10 and a handle 11 formed integral with or secured to said disk. The disk 10 has its edge portion turned over as at 12 for strengthening the disk, and in a manner to produce a bead at the under side of the disk for sustaining the latter elevated above the bottom of a frying pan A. The disk is perforated as indicated at 13.

With a utensil formed as described the perforated body of the disk will be elevated slightly above the pan bottom, thereby providing a space from beneath for a sufficiency of grease and the arrangement is such that the grease may rise through the perforations 13.

The handle 11 rises from the disk preferably obliquely and is then offset rearwardly as at 14, from which offset portion the handle rises in curved or arched form as at 15, the rear downwardly curved terminal 16 of which presents a concave lower edge 17. The bend 18 at the juncture of the offset portion 14 and curved portion 15 are so positioned relatively to the disk 10 that the handle at said bend will rest on the handle *a* of the frying pan adjacent to the juncture of the handle, and the body of the pan. In addition there is a positive engagement with the handle *a* by reason of the concave terminal edge 17 so that the attachment will be maintained in proper relative position to the pan handle *a* for the convenient joint manipulation of the pan and my improved utensil. Also, the arched portion 15 provides for the convenient placing and lifting of the utensil.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim:—

As a new article of manufacture, a utensil for use in connection with a frying pan in frying or poaching eggs, the same comprising a substantially flat disk perforated for the passage of grease or water in frying or poaching the eggs and presenting otherwise a substantially continuous area to hold the eggs intact, said disk presenting an edge bead to sustain the egg-supporting area slightly above the bottom of the frying pan for permitting circulation of the grease or water, and a handle rigid with said disk, said handle rising from the disk and then extending laterally to rest upon the handle of the frying pan.

FRED EIDT.